United States Patent [19]
Pantelakis et al.

[11] Patent Number: 5,553,295
[45] Date of Patent: Sep. 3, 1996

[54] METHOD AND APPARATUS FOR REGULATING THE OUTPUT VOLTAGE OF NEGATIVE CHARGE PUMPS

[75] Inventors: Dimitris Pantelakis, Folsom; Kerry Tedrow, Orangevale, both of Calif.

[73] Assignee: Intel Corporation, Santa Clara, Calif.

[21] Appl. No.: 217,094

[22] Filed: Mar. 23, 1994

[51] Int. Cl.$^6$ .............................. G06F 1/26; H02M 3/18
[52] U.S. Cl. ......................... 395/750; 363/60; 365/218; 365/226
[58] Field of Search ..................... 395/750, 550; 363/59, 60; 365/226, 227, 229, 218; 327/530

[56] References Cited

U.S. PATENT DOCUMENTS

| | | | |
|---|---|---|---|
| 4,291,366 | 9/1981 | Nelson | 363/17 |
| 4,638,464 | 1/1987 | Cranford, Jr. et al. | 365/226 |
| 5,168,174 | 12/1992 | Naso et al. | 307/296.6 |
| 5,199,032 | 3/1993 | Sparks et al. | 371/3 |
| 5,216,588 | 6/1993 | Bajwa et al. | 363/60 |
| 5,301,161 | 4/1994 | Landgraf et al. | 365/229 |
| 5,337,284 | 8/1994 | Cordoba et al. | 365/227 |
| 5,392,205 | 2/1995 | Zavaleta | 363/59 |
| 5,410,465 | 4/1995 | Tan | 363/60 |
| 5,422,586 | 6/1995 | Tedrow et al. | 327/306 |
| 5,426,391 | 6/1995 | Tedrow et al. | 327/530 |

OTHER PUBLICATIONS

Miyawaki et al, "A New Erasing and Row Decoding Scheme for Low Supply Voltage Operation 16-Mb/64-Mb Flash Memories", IEEE Journal of Solid State Circuits, vol. 27, No. 4, Apr. 1992 pp. 583–587.

Umezawa et al, "A 5-V-Only Operation 0.6-um. Flash EEPROM with Row Decoder Scheme in Triple-Well Structure," IEEE Journal of Solid-State Circuits, vol. 27, No. 11, Nov. 1992 pp. 1540–1545.

Jinbo et al, "A 5-V-Only 16-Mb Flash Memory with Sector Erase Mode", IEEE Journal of Solid State Circuits, vol. 27, No. 11, Nov. 1992, p. 15471553.

Primary Examiner—Jack B. Harvey
Assistant Examiner—Glenn A. Auve
Attorney, Agent, or Firm—Blakely, Sokoloff, Taylor & Zafman

[57] ABSTRACT

A regulation circuit which includes circuitry for furnishing a reference voltage, a voltage divider for furnishing a voltage provided by a charge pump circuit, a comparator for comparing the output of the charge pump circuit with the reference voltage, and apparatus for operating the charge pump when the voltage drops below the reference level and for interrupting operation of the charge pump when the voltage produced by the charge pump becomes greater than the reference voltage.

10 Claims, 4 Drawing Sheets

5,553,295

METHOD AND APPARATUS FOR REGULATING THE OUTPUT VOLTAGE OF NEGATIVE CHARGE PUMPS

BACKGROUND OF THE INVENTION

1. Field of the Invention

This invention relates to computer systems, and more particularly, to methods and apparatus for regulating the output voltage of charge pumps used to generate high voltage levels from lower level source voltages.

1. History of the Prior Art

There has been a recent trend toward lowering the power requirements of portable computers. In order to reduce power consumption, much of the integrated circuitry used in personal computers is being redesigned to run at low voltage levels. The circuitry and components used in portable computers are being designed to operate at voltage levels such as 5 volts and 3.3 volts. This helps a great deal to reduce the power needs of such computers.

However, some of the features of portable computers require voltages higher than these supply voltages. For example, flash electrically-erasable programmable read only memory (flash EEPROM memory) has begun to be used to store the basic input/output startup (BIOS) processes used by a computer. This memory may be erased and reprogrammed without removing the BIOS circuitry from the computer by running a small update program when the BIOS processes are to be changed. However, erasing and reprogramming flash EEPROM memory requires approximately twelve volts to accomplish.

Another type of flash EEPROM memory array provides another example of high voltage requirements in portable computers. This type of flash EEPROM memory array provides a new form of long term random access storage. An example of a flash EEPROM memory array which may be used in place of a hard disk drive is described in U.S. patent application Ser. No. 07/969,131, entitled *A Method and Circuitry For A Solid State Memory Disk*, S. Wells, filed Oct. 31, 1992, and assigned to the assignee of the present invention. Such an array provides a smaller lighter functional equivalent of a hard disk drive which operates more rapidly and is not as sensitive to physical damage. Such memory arrays are especially useful in portable computers where space is at a premium and weight is important. These flash EEPROM memory arrays also require much higher voltages and substantially more power for programming and erasing data than can be provided directly by the batteries of low powered portable computers.

One way in which the power requirements of the flash EEPROM arrays have been reduced is through the use of negative gate erase techniques. These techniques reduce the amount of current required during the erase process and thereby reduce the power used.

In other electronic arrangement, charge pump circuits have been used to provide a high voltage from a lower voltage source. However, it is necessary to provide very accurate voltages for programming and erasing the cells of a flash EEPROM memory array. Charge pumps and other circuitry implemented as a part of integrated circuits provide output voltages which typically vary over a range of source voltages, operating temperatures, process variations, and load currents. Moreover, when using charge pumps the voltage level provided at an output terminal tends to vary substantially from a desired value. This occurs because the output of a charge pump is furnished in a series of charge pulses which are stored to provide an output voltage. The charge pump generates this form of output because the output and other stages function in the manner of a diode which only transfer charge in a properly biased condition. This creates a voltage ripple on the output of the pump when the current requirements are high relative to the capacitance of the load.

These problems make it desirable to attempt to regulate the output voltage provided by the charge pumps to obtain a relatively constant value which is not affected by variations in source voltage, operating temperature, process, or load current. Moreover, it is especially desirable to regulate the output voltage provided by charge pumps utilized to generate voltages used for negative gate erase operations.

SUMMARY OF THE INVENTION

It is, therefore, an object of the present invention to provide a method and apparatus for regulating the output of a charge pump to provide a relatively constant output voltage value for erasing flash EEPROM memory cells.

It is another, more specific, object of the present invention to provide a method and apparatus for regulating the output of a negative charge pump to provide a relatively constant output value which may be used to erase flash EEPROM memory cells.

These and other objects of the present invention are realized in a regulation circuit which includes circuitry for furnishing a reference voltage, a voltage divider for furnishing a voltage provided by a charge pump circuit, a comparator for comparing the output of the charge pump circuit with the reference voltage, and means for operating the charge pump when the voltage drops below the reference level and for interrupting operation of the charge pump when the voltage produced by the charge pump becomes greater than the reference voltage.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
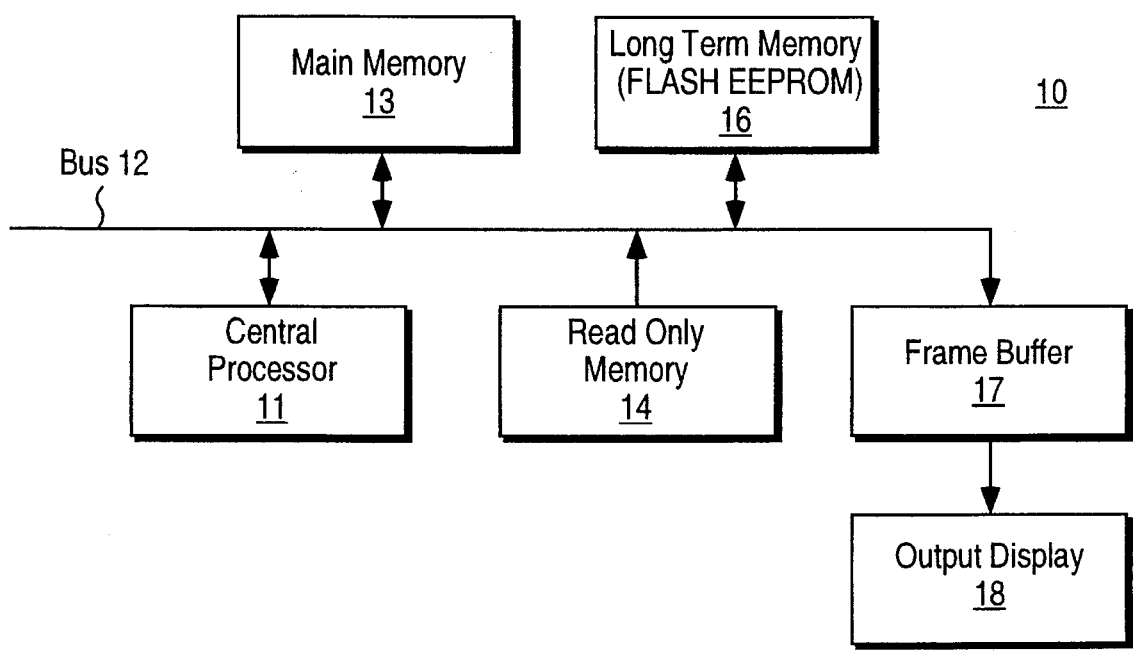
FIG. 1 is a block diagram of a computer system the elements of which may combine to provide the present invention.

Referring now to FIG. 1, there is illustrated a computer system 10. The system 10 includes a central processing unit 11 which executes the various instructions provided to the computer system 10 to control its operations. The central processing unit 11 is joined to a bus 12 adapted to carry information to various components of the system 10. Joined to the bus 12 is main memory 13 which is typically constructed of dynamic random access memory arranged in a manner well known to those skilled in the prior art to store information during a period in which power is provided to the system 10. Also joined to the bus 12 is read only memory 14 which may include various memory devices well known to those skilled in the art each of which is adapted to retain a particular memory condition in the absence of power to the system 10. The read only memory 14 typically stores various basic functions used by the processor 11 such as basic input/output processes and startup processes typically referred to as BIOS processes. Such read only memory 14 may be constructed of flash EEPROM memory cells adapted to be modified as various ones of the BIOS processes used by a particular computer system are changed. Such flash EEPROM memory may include circuitry for programming and erasing the memory array. If the memory 14 is constructed of flash EEPROM memory cells, it may be modified by running an update process on the computer system itself to reprogram the values stored in the memory 14.

Also connected to the bus 12 are various peripheral components such as long term memory 16 and circuitry such as a frame buffer 17 to which data may be written which is to be transferred to an output device such as a monitor 18 for display. Rather than the typical electro-mechanical hard disk drive which is typically used for long term memory, a flash EEPROM memory array may be used as the long term memory 16. Such flash EEPROM memory arrays are programmed and erased through techniques which utilize voltages greater than those typically available to the integrated circuits of more advanced portable computers. Such flash EEPROM memory arrays may include circuitry for programming and erasing the memory array. Consequently, in accordance with the present invention, such long term memory arrays as well as memory 14 may provide circuitry for generating high voltages from the lower voltages available from the batteries available in the portable computers in which such arrays are typically found.

A flash EEPROM memory array is made up of memory cells which include floating gate field effect transistor devices. Such memory transistors may be programmed to change the charge stored on the floating gate, and the condition (programmed or erased) may be detected by interrogating the cells. The conventional method of erasing an array of flash EEPROM memory cells erases all of the cells together (or at least some large block thereof). Typically, this requires the application of twelve volts to the source terminals of all of the memory cells, grounding the gate terminals, and floating the drain terminals. This conventional form of erasing flash EEPROM memory arrays is referred to as positive source erase. This positive source erase has been felt to require a larger amount of current because of the diode action between the source and substrate of a N type flash EEPROM memory cell. A N type flash EEPROM memory cell has a N doped source region surrounded by a P doped substrate. The P doped substrate is grounded so that a diode junction is formed at the junction separating the source and the substrate. When twelve volts is switched to the source terminal in the positive source erase process, the diode junction between the source and substrate is biased into the breakdown region so that substantial source current flows. Because of this substantial source current when the erase process is conducted using positive source erase technique, the source of the high erase voltage must be able to furnish a substantial amount of current. For this reason, designers have been attempting to provide negative gate erase techniques to obviate the loss of current through the diode effect. In this manner, charge pumps may provide sufficient current to generate the power for effectively erasing and programming flash EEPROM memory.

In accordance with the newer negative erase technique, a large negative voltage (typically minus nine volts) is provided at the gate terminal of the memory device; and Vcc (typically five volts) is provided at the source terminal. The five volts at the source terminal is not sufficient to break down the source-substrate junction diode of the device, and only a relatively insubstantial amount of source current flows. Consequently, though similar voltage differentials are applied between the gate and source terminals of the device, the negative erase technique requires much less current from the charge pump.

Figure 2:
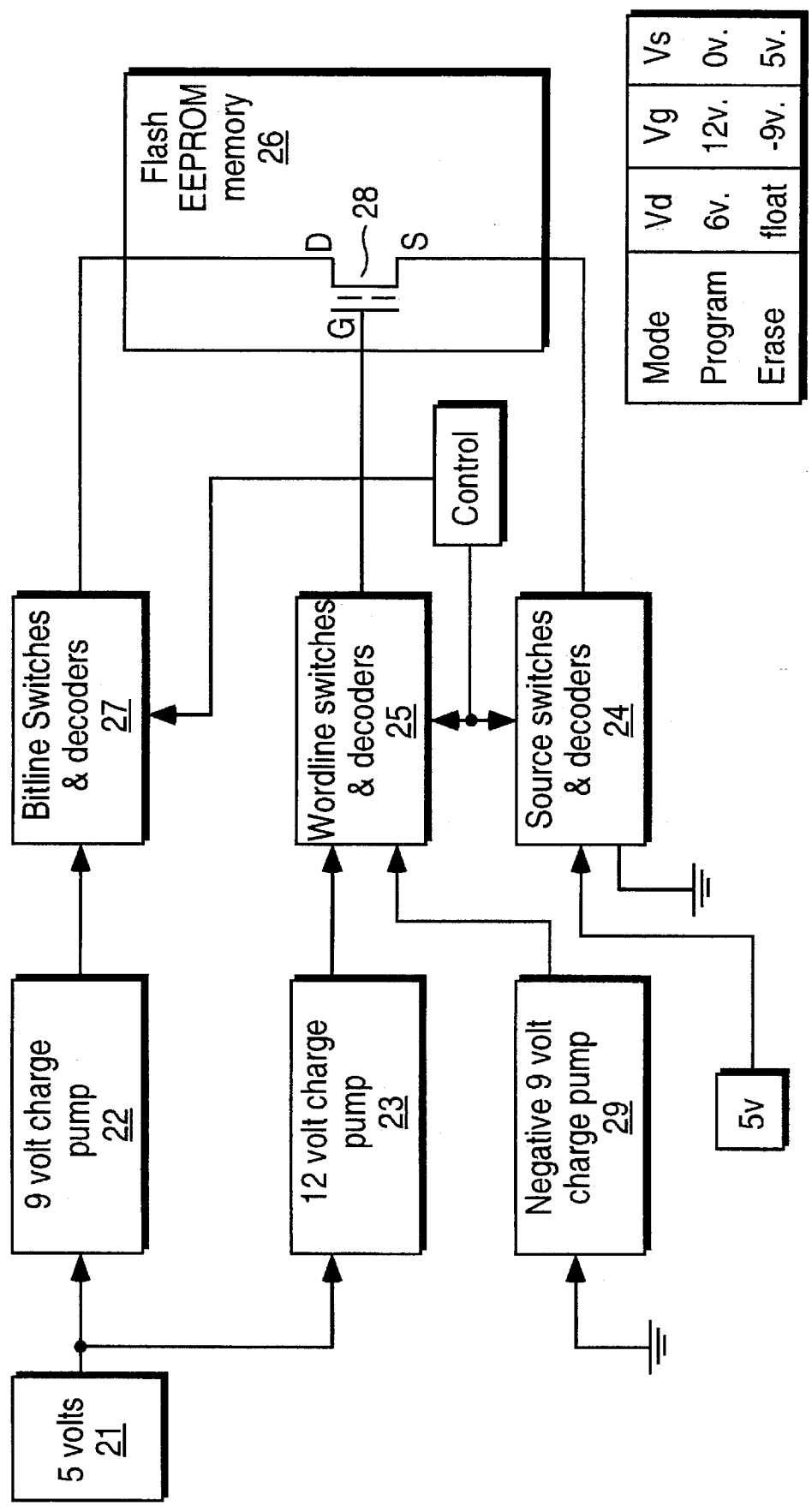
FIG. 2 is a block diagram of a circuit arrangement for programming and erasing a flash EEPROM memory array such as the arrays illustrated in FIG. 1.

FIG. 2 is a block diagram which illustrates a circuit 20 including a flash EEPROM memory array 26 and circuitry for programming and erasing the flash EEPROM memory array 26 in accordance with the present invention. This circuit 20 includes a source of voltage 21 such as a low powered battery capable of furnishing five volts. Voltage from the source 21 is provided to two charge pump circuits 22 and 23. The charge pump circuit 22 is devised to provide a pumped output voltage of approximately 9 volts, and the charge pump 23 is devised to produce a pumped output voltage of approximately twelve volts. A separate the charge pump 29 is devised to produce a pumped output voltage of approximately minus nine volts.

Voltage from the pump 23 is furnished to a set of wordline switches and decoders 25 during programming. These switches, in a manner well known to those skilled in the art, provide voltages to the gate terminals of flash EEPROM memory transistors 28 (only one transistor 28 is illustrated).

Voltage from the pump 29 is also furnished to the set of wordline switches and decoders 25 which provide voltages at the gate terminals of flash EEPROM memory transistors 28 for erasing operations. The wordline switches and decoders select which voltage is applied to the gate terminals of the memory transistors depending on whether the operation is program or erase. For example, the negative voltage provided by the charge pump 29 is applied to the gate terminals of the memory cells 28 during the erase operation. The voltage furnished by the charge pump 22 is furnished to a set of bitline switches and decoders 27 provide voltages at the drain terminals of flash EEPROM memory transistors 28. A third set of switches and decoders 24 apply ground or five volts to the source terminals of the memory cells 28. Each of the sets of switches and decoders 24, 25, and 27 may be controlled by signals from a control circuit to provide appropriate voltages at erase and programming to accomplish those results. In a preferred embodiment, the control circuit is a microprocessor designed to provide control of all of the operations of the memory array 26 including reading, programing, and erasing among other things. The use of such a control circuit is described in U.S. patent application Ser. No. 08/086,186, entitled *Flash Memory Array System And Method*, M. Fandrich et al, filed Jun. 30, 1993, and assigned to the assignee of the present invention. The control provided by the control circuit might be provided in other arrangements by some external source of control such as a central processing unit.

At the lower right corner of FIG. 2 is shown a table which includes the voltages which are applied to the various terminals of the memory cells during the program and erase operations using negative source erase techniques. As may be seen, the erasing of the memory device 28 requires that a positive five volts be applied to the source terminal of the device 28, minus nine volts be applied to the gate terminal, and the drain be floated. The five volts at the source terminal is not sufficient to break down the source-substrate junction diode of the device, and only a relatively insubstantial amount of source current flows. Consequently, the negative erase technique requires much less current from the charge pump than does the positive erase technique and enhances reliability.

Figure 3:
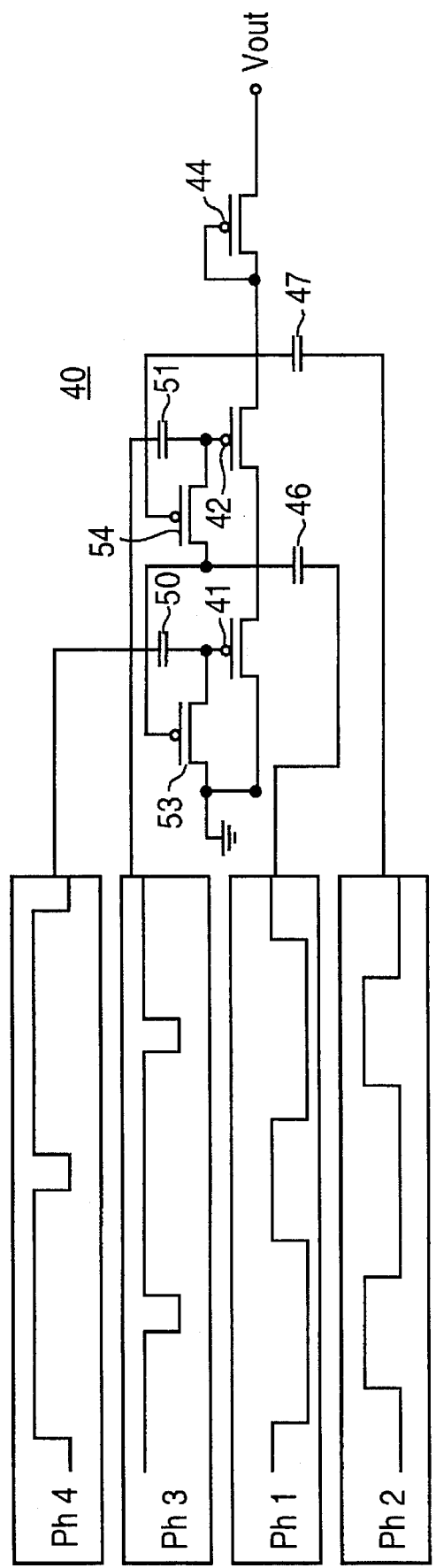
FIG. 3 is a block diagram of a negative charge pump circuit which illustrates its operation in the present invention.

To accomplish negative erase of the array, a precise negative voltage is furnished from a charge pump to the set of wordline switches and decoders to provide voltages at the gate terminals of the flash EEPROM memory transistors. FIG. 3 illustrates a first bootstrap pump arrangement which may be utilized to provide the high negative voltages required for erasing flash EEPROM memory arrays in accordance with the negative erase technique using four trains of clock pulses. As will be apparent to those skilled in the art, a similar charge pump with P channel transistors replaced by N channel transistors and having a positive voltage input may be utilized to provide the high positive voltages for accomplishing positive source erase operations and other operations such as programming requiring positive output voltages. As is shown in FIG. 3, the pump 40 includes a number of stages of P type field effect transistors (FETs) 41, 42, and 44 connected in series between ground and an output terminal Vout. Input clock signals are furnished to the circuit 40 from sources illustrated via capacitors 46 and 47. A second set of input clock signals are furnished from sources illustrated by capacitors 50 and 51. Each stage of the circuit 40 includes a P channel field effect transistor device 53 or 54 used to precharge the gate terminal of the device 41 or 42 of that stage. The first stage is comprised of transistors 41 and 53 and capacitors 46 and 50.

The four individual clock signals referred to as phase 1, phase 2, phase 3, and phase 4 are shown in FIG. 3. Each of these clock signals provides a high value of Vcc and a low value of ground. Circuitry for furnishing these four phases of non-overlapping clock pulses are described in U.S. patent application Ser. No. 08/217,166, entitled *Method and Apparatus for Generating Four Phase Non-overlapping Clock Pulses for a Charge Pump*, D. Pantelakis, filed on even date herewith, and assigned to the assignee of the present invention. In order to understand the operation of the circuit 40, the operation of a single stage including the transistor 42 will first be discussed. Following the timing diagram of FIG. 3, the phase 2 and phase 4 clocks are initially low. Since the phase 2 clock is low, the control device 54 is initially on. When the phase 1 clock signal goes low, the negative voltage pulse applied through the capacitor 46 charges the capacitor 51 at the gate terminal of the device 42 through the device 54 to the negative voltage level of the source terminal of the device 42. When the phase 2 clock then goes high, the device 54 turns off, isolating the gate of the device 42 and leaving the capacitor 51 charged to a negative level.

When the phase 3 clock then goes low, the voltage at the gate terminal of the device 42 is appreciably lower than the voltage at the source terminal because of the precharging of the capacitor 51 to a negative value. This turns the device 42 on in the region in which it experiences no threshold voltage (Vt) drop. The elimination of the Vt drop means that increased current is transferred more rapidly from the capacitor 46 to the next stage. The negative voltage phase 1 pulse at the capacitor 46 begins to charge the capacitor 47 (toward a value of minus Vcc).

When the phase 3 clock then goes high, the device 42 begins to go off. When the phase 2 clock goes low, the capacitor 47 goes to approximately minus Vcc; and the device 54 turns on discharging the gate of the device 42 and bringing it toward the voltage of the drain so that the device 42 turns off rapidly. When the phase 1 clock then goes high, the device 42 stays off and the device 54 stays on so that the charge at the drain and gate terminals of the device 42 are equalized.

Viewing the circuit as a whole, when the device 41 comes on in response to the negative edge of the phase 4 clock, the capacitor 50 at its gate terminal has been placed at ground through the device 53 which has gone off. Thus, the gate terminal of the device 41 is forced much lower than the source terminal and the device 41 comes on without a Vt drop and charges the capacitor 46 and the capacitor 51 to ground level very rapidly. Then the device 41 begins to turn off as the phase 4 clock goes high. The drop of the phase 1 pulse causes the capacitor 46 to go to minus Vcc and completes the turnoff of the device 41 by discharging the capacitor 50 through the device 53. The low value phase 1 clock continues the charging of the capacitor 51 until the rise of the phase 2 clock turns off the device 54 leaving the gate of the device 42 charged. As explained above, the device 42 comes on completely without a Vt drop when the phase 3 clock goes low and the gate terminal of the device 42 which is charged to a negative value goes below the source terminal. This allows the rapid charge of the capacitor 47 to a negative value of approximately minus two times Vcc. The same sequence would continue through whatever number of stages are present until the charge on the capacitor 48 is sufficient to turn on the device 44 to provide a pumped voltage level at the output of the circuit 40. It should be noted that the device 44 operates in a range in which it exhibits a Vt drop since no bootstrap transistor is provided.

This basic operation continues in the manner explained. The two stage pump circuit 40 illustrated in FIG. 3 furnishes a negative voltage of approximately N (where N is the number of stages) times the pumped voltage Vcc at the output terminal less the Vt drop of the device 44. The circuit 40 provides a very efficient operation because the circuit 40 does not have the threshold voltage drops of the usual charge pump circuit except for the last stage. This allows it to provide more current at the output and to do it more rapidly.

Figure 4:
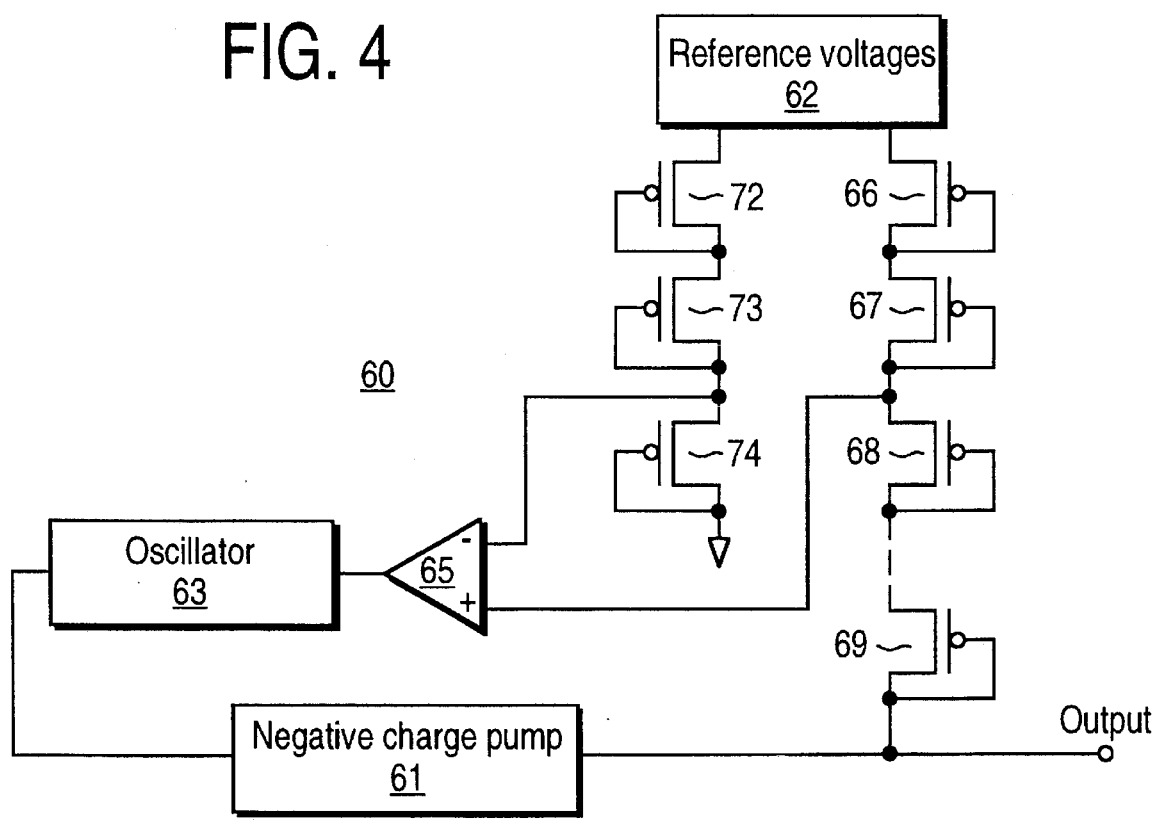
FIG. 4 is a block diagram of a circuit for providing the present invention.

Referring now to FIG. 4, there is shown a circuit 60 designed in accordance with the present invention. The circuit 60 includes a negative charge pump 61 such as that illustrated in FIG. 3 designed to produce a negative output voltage. As was described above, the operation of the pump 61 and, consequently, the value of the voltage produced by the pump 61 depends on the value of the clock signals provided to the pump 61 by an oscillator circuit 63. The oscillator circuit 63 is turned on and off by signals furnished by a comparator circuit 65. In one embodiment the comparator circuit 65 may be a differential amplifier circuit.

When the oscillator 63 is on and generating clock pulses, the negative charge pump 61 provides an output voltage at its output terminal which builds to a value determined by the components of the pump 61 and the shape of the clock pulses. In order to cause the pump 61 to generate a relatively constant output value, the output voltage is level shifted by use of a series of diode-connected P type field effect transistor (FET) devices 66–69. The series of transistor devices 66–69 is joined to a reference voltage provided by a source of reference voltage 62 to form a divider circuit. The series of transistor devices 66–69 functions as a voltage divider to provide an input to one input terminal of the comparator circuit 65. Another input to the comparator circuit 65 is provided by another series of diode-connected P type FET devices 72–74 joined between ground and the reference voltage provided by the source of reference voltage 62. In the embodiment discussed, the reference voltage has a value of four volts. It will be understood by those skilled in the art that resistors or other devices might be used in place of the transistor devices 66–69 and 72–74 in order to provide voltage divider arrangements.

Figure 5:
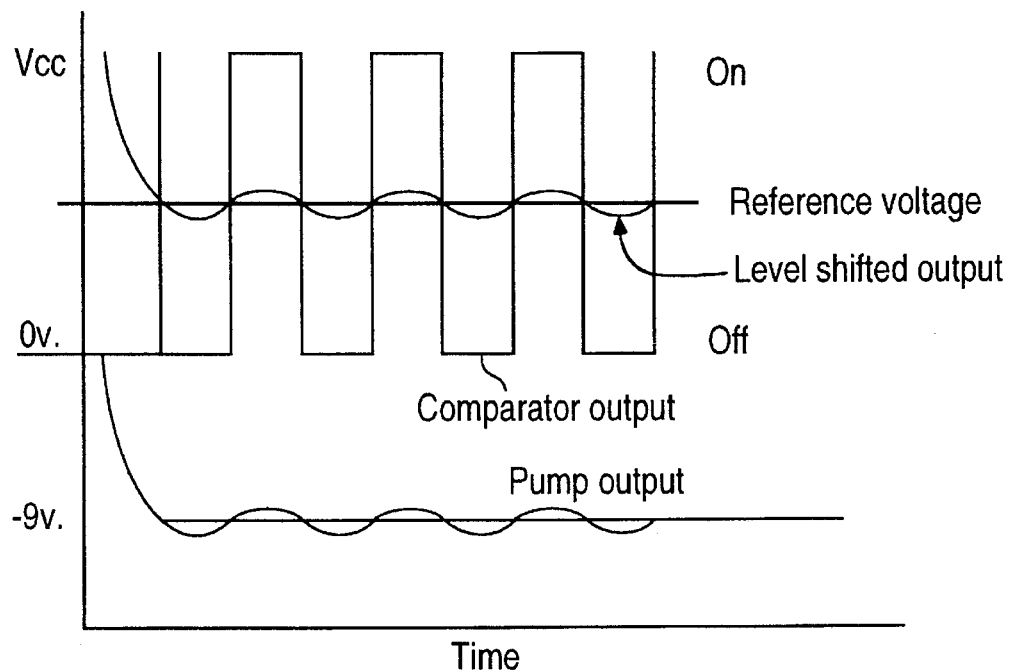
FIG. 5 is a timing diagram illustrating the values of different signals used in the circuit of FIG. 4.

As may be seen in FIG. 5, if the level of voltage provided at the output of the pump 61 is less (more positive) than the level desired (e.g., minus nine volts), then the value of the input at the positive terminal of the comparator circuit 65 is more positive than the level provided at the negative terminal of the comparator circuit 65. This input condition of the comparator circuit 65 keeps the oscillator 63 turned on and gradually increases the output of the pump 61. When the level of the output voltage provided by the pump 61 becomes greater than (more negative) than the level desired, then the value of the input at the positive terminal of the comparator circuit 65 is less positive than the level provided at the negative terminal of the comparator circuit 65. This input condition of the comparator circuit 65 turns the oscillator 63 off and gradually decreases the negative output of the pump 61 as the voltage buildup on the output capacitance gradually dissipates.

FIG. 5 illustrates that the value at the output of the pump may be kept at a relatively constant value by the use of the circuit 60. The upper curve illustrates the value of the level furnished at the positive input terminal of the comparator circuit 65. The reference voltage is constant and represents the level that the shifted output voltage from the circuit 61 is compared to. The square wave illustrates the output provided by the comparator circuit 65 to turn the oscillator circuit 63 on and off. The lower curve illustrates the value of the negative output voltage provided by the pump 61 in accordance with the present invention. This constant value may then be utilized in the manner described above to provide negative erase voltages to the wordlines (gate terminals) of the flash EEPROM memory array with which the particular charge pump is associated.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A regulation circuit, comprising:
   a source of a reference voltage,
   a charge pump circuit,
   a first voltage divider circuit connected between an output of the charge pump and the source of reference voltage for furnishing a first voltage,
   a second voltage divider connected between the source of reference voltage and a known voltage level for furnishing a second voltage,
   a comparator for comparing the output of the charge pump circuit with the reference voltage, and
   an oscillator for operating the charge pump when the first voltage is less than the second voltage and for interrupting operation of the charge pump when the first voltage is greater than the second voltage.

2. A regulation circuit as claimed in claim 1 in which each of the first and second voltage divider circuits includes a diode-connected transistor.

3. A regulation circuit as claimed in claim 2 in which the comparator is a differential amplifier circuit.

4. A regulation circuit as claimed in claim 1 in which the charge pump is a negative charge pump.

5. A regulation circuit as claimed in claim 1 in which the charge pump is a bootstrap charge pump, and the oscillator provides four trains of non-overlapping clock pulses for driving the charge pump.

6. A computer system, comprising:
   a central processor;
   a system bus coupled to the processor;
   a main memory coupled to the system bus; and
   a programmable non-volatile long term memory coupled to the system bus, further comprising
      a flash EEPROM memory array, and
      a circuit for furnishing voltages for operating the flash EEPROM memory array that further comprises
         a source of a reference voltage,
         a charge pump,
         a first voltage divider circuit connected between an output of the charge pump and the source of reference voltage for furnishing a first voltage,
         a second voltage divider connected between the source of reference voltage and a known voltage level for furnishing a second voltage,
         a comparator for comparing the output of the charge pump circuit with the reference voltage, and
         an oscillator for operating the charge pump when the first voltage is less than the second voltage and for interrupting operation of the charge pump when the first voltage is greater than the second voltage.

7. A computer system as claimed in claim 6 in which each of the first and second voltage divider circuits includes a diode-connected transistor.

8. A computer system as claimed in claim 6 in which the comparator is a differential amplifier circuit.

9. A computer system as claimed in claim 6 in which the charge pump is a negative charge pump.

10. A computer system as claimed in claim 6 in which the charge pump is a bootstrap charge pump, and the oscillator provides four trains of non-overlapping clock pulses for driving the charge pump.

* * * * *